Figure 1:
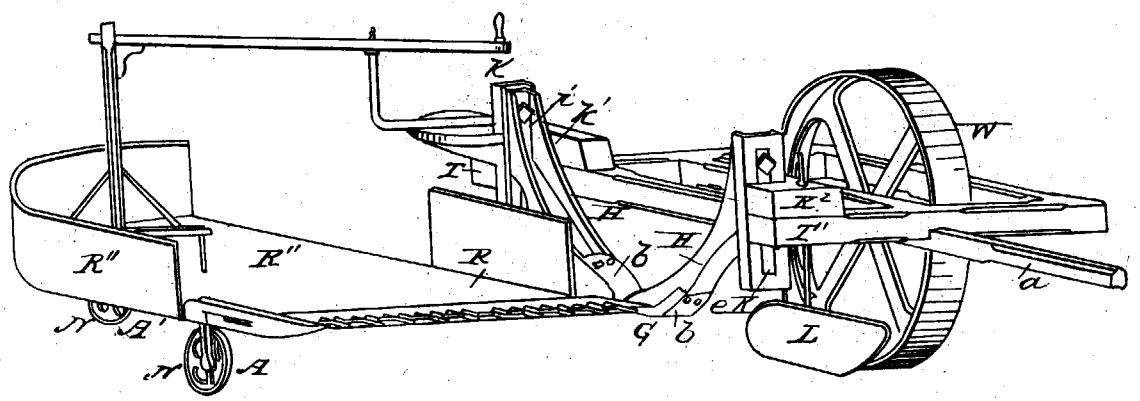

2 Sheets—Sheet 1.

E. B. FORBUSH.

Harvester.

No. 1,972. Reissued May 23, 1865.

Witnesses.

James H Gridley
Allen J Langston

Inventor:

E Wheeler Jr
By P. B. Forbush
atty

N. PETERS, Photo-Lithographer, Washington, D. C.

2 Sheets—Sheet 2.
E. B. FORBUSH.
Harvester.
No. 1,972. Reissued May 23, 1865.
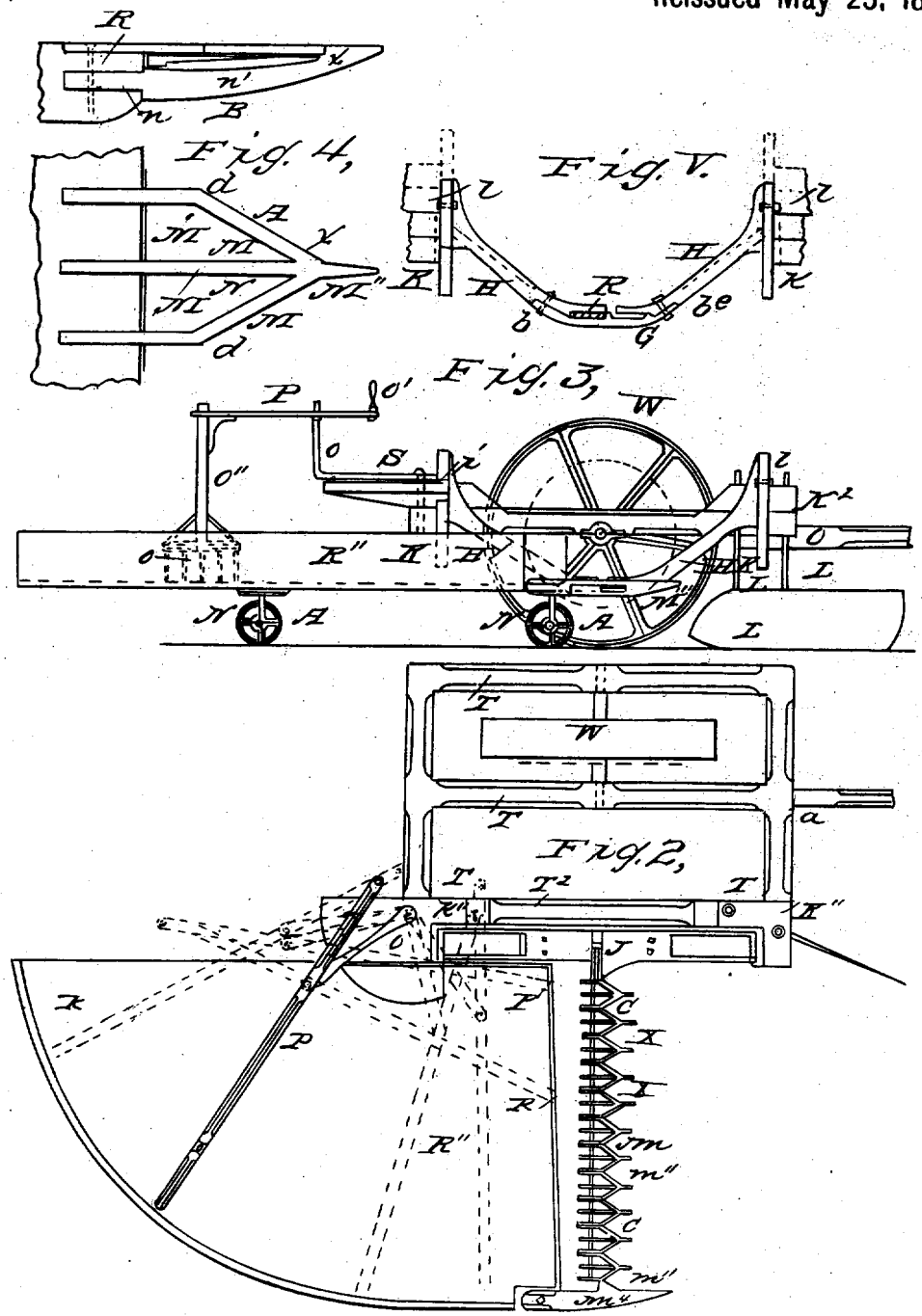
Witnesses:
James H. Gately
Alland Langston
Inventor
C. Whuler Jr
By E. B. Forbush
Atty
N. PETERS. Photo-Lithographer, Washington, D. C.

UNITED STATES PATENT OFFICE.

CYRENUS WHEELER, JR., OF POPLAR RIDGE, NEW YORK, ASSIGNEE, BY MESNE ASSIGNMENTS, OF E. B. FORBUSH.

IMPROVEMENT IN HARVESTERS.

Specification forming part of Letters Patent No. 9,134, dated July 20, 1852; Reissue No. 376, dated July 8, 1856; Reissue No. 692, dated April 19, 1859; Reissue No. 1,972, dated May 23, 1865.

DIVISION A.

*To all whom it may concern:*

Be it known that ELIAKIM B. FORBUSH, of the city of Buffalo, county of Erie, and State of New York, heretofore invented certain new and useful Improvements in Grain and Grass Harvesting Machines, for which Letters Patent of the United States were duly granted and issued to the said FORBUSH on the 20th day of July, 1852, and subsequently reissued on the 8th day of July, 1856, and again reissued on the 19th day of April, 1859, but which said last-mentioned Letters Patent are now deemed to be invalid and inoperative by reason of a defective and insufficient specification; now, therefore, I, CYRENUS WHEELER, Jr., of Poplar Ridge, in the county of Cayuga and State of New York, assignee, by mesne assignments, of the whole interest of, in, and to the said invention and improvements, do hereby declare, pursuant to the statute in such case made and provided, that the following is a full and exact description thereof, reference being had to the accompanying drawings, making a part of this specification.

To enable others skilled in the art to make and use said invention and improvements as combined and used in one machine, I will proceed to describe the same.

In the accompanying drawings, Figure I is a perspective view of said improvements, as shown in a combined reaper and mower as adjusted and arranged for reaping. Fig. II is a plan or top view of the same. Fig. III is a side view. Fig. IV is a plan or top view and side view of one of the guard-fingers. Fig. V is a side view of a device herein called a "clamp," by which the finger-bar is supported.

The main frame of the machine is composed of the longitudinal timbers $T^2$ $T^3$ $T^4$ and the cross-timbers T and T′. To the under side of the main frame is attached the draft-pole *a*, as shown in the drawings. The frame, thus constructed, is supported on the main driving-wheel W. The cross-timbers T and T′ project inwardly beyond the inner timber, $T^2$, and are provided on their upper sides with the supporting-pieces K′ K″. On the inside of the projecting timbers are securely fastened iron frames K K. These frames are made of cast-iron, and have recesses 1 for the reception of the brace-arms H H of the clamp, which brace-arms extend downwardly and toward each other, and which, together with the shoe G, form a clamp or movable frame for supporting and adjusting the finger-bar and cutters. These brace arms H H are held in place by means of bolts *i i*, which pass through slots in the frames K K and holes in the arms H H. The slots in the frames K K are for the purpose of allowing the clamp as a whole, and with it the finger-bar and cutters, to be adjusted to any desired height for cutting grass or grain without changing the horizontal position of the main frame. All that is necessary in order to adjust the finger-bar and cutters to different heights above the ground is to loosen the nuts *i i* sufficiently to permit the brace-arms H H to be moved up or down, as the case may be, and then turn the nuts on the bolts *i i* tight again, and thereby hold the brace-arms firmly when placed.

The shoe G is attached to the lower ends of the brace-arms by means of bolts *b* and *be*. The form of the shoe G, as well as the manner in which it is connected to the lower ends of the brace-arms, is fully shown in Figs. I and V. By reference to these it will be seen that the formation of the shoe G and the lower part of the rear brace-arm is such that a rectangular opening, R, is formed between them. Into this space or opening the inner end of the finger-bar R′ is placed, and is there securely held by compression without the necessity of passing bolts through the finger-bar. The compression is obtained by means of the bolts *b*, which pass through the shoe and the brace-arm. By this construction and arrangement of the several parts composing the clamp it is brought down to the ground and forms a runner, in mowing, bearing on the ground at a right line with the nadir of the driving-wheel. By this arrangement the whole machine is kept upright and rendered of easy draft when mowing, for the reason that the weight of the machine as a whole rests upon the ground at two points—viz., at the bottom of the driving-wheel and runner G. The shoe or runner G is made runner shape at both ends thereof. As these two points are at some distance apart and always in line, or nearly so, the machine is well balanced and relieved from injurious side draft or twisting of the finger-bar. It will also be seen that the finger-bar can be quickly removed, and that when so removed the machine will remain upright, and may be conveniently moved from field to field, as if supported upon two wheels, (when adjusted for mowing.) The runner part G being wide and smooth on the bottom, it will slide easily and smoothly on the loose grass and stubble which may lie in its track.

To the front of the finger-bar R′ are attached guard-fingers X, through which the cutters work and against which the stalks of grain and grass are cut. The cutters are operated in the usual manner by suitable mechanism connected with the driving-wheel.

Connected with the finger-bar R′, and in rear of it, is the platform R″ for receiving the cut grain. It is quadrant-shaped, as clearly shown in the drawings, and has its point of delivery at its side and behind or in the rear of the main frame.

The cutting apparatus, supported by the finger-bar R′, is connected to the main frame so as to occupy a position in rear of a line drawn through the front of the main wheel W, and nearly opposite the center thereof. By this arrangement of the cutting apparatus and platform relatively to the main frame and driving-wheel the point at which the grain is cut and falls upon the platform is brought nearer to the point of delivery, which is behind the main frame, than in a machine where the cutting apparatus is located in front of a line passing through the front of the main wheel. Consequently the delivery-path in which the grain must travel is shorter and the arc of the circle less, while sufficient space is obtained to permit the grain to be turned upon the platform and discharged therefrom in gavels upon the ground in rear of the main frame and at the side of the platform, and in a position nearly at right angles to that in which it fell upon the platform, the butts of the gavels lying toward and the heads from the delivery side of the platform. By thus bringing the point of cutting and the point of delivery nearer together than has been done in other machines less expenditure of power is required to deliver the grain than in a machine having its cutting apparatus in front of the wheel. The gavels, when delivered from the platform in the position described, are far enough from the standing grain to permit the passage of the team and machine in the succeeding swath, thereby avoiding the necessity of the binding or removal of the gavels before finishing cutting the field. The position in which the gavels lie when thus discharged is such that the binder in passing from one gavel to another in the process of binding approaches the gavels at their side, which diminishes the labor and facilitates the work.

The raking may be done in this manner by an ordinary hand-rake. To further facilitate the work of discharging the cut grain from the platform, a raking device is provided and mounted on the main frame in rear of the axis of the driving-wheel as follows: To the upper side of the rear right corner of the machine is attached the right-angled arm O by means of the bolt or spindle S. On the upper end of the right-angled arm O is placed the rake-arm P, which extends on both sides of the point where it is connected to the arm O, having on one end a handle, O′, and on the other a downwardly-projecting arm, O″, which carries the rake O‴, as shown in Fig. III. The rake can therefore be moved over the platform in almost any direction to remove the grain in suitable gavels for binding, it being so provided that the arm P can turn on the arm O, and the arm O can turn on the spindle or fulcrum bolts, and thus accommodate the rake to any position or movement required for an easy and efficient delivery of the grain. By constructing and using a rake upon this principle the grain can first be moved back on the platform in a line parallel with the line of motion of the machine, and then turned and delivered in rear of the machine. This is done by bringing the rake over the grain as it falls on the platform and then dropping it on the grain so that it will occupy a position at right angles to the line of motion of the machine, whereby the grain is carried back by the backward motion of the rake in a line parallel to the line of motion as far as desired, and then turned and delivered in rear of the main frame of the machine at the side of the platform. Some of the different positions of the rake are indicated by the dotted lines in Fig. II.

It is sometimes desirable to compress or gather the grain to one side of the platform before its delivery. This is done by throwing the rake to the inside of the platform, and parallel with the stalks of grain on the platform, and then moving it toward the other side until the grain is sufficiently compressed, and then the grain is turned upon the platform by an appropriate movement of the rake, and delivered upon the ground in rear of the main frame and at the side of the platform. If preferred, however, the grain may be swept from the platform by a circular movement of the rake and delivered as aforesaid. It will be noticed that by the arrangement of this raking apparatus and platform the grain can be delivered at the necessary distance from the platform, so as to render the delivery complete, whether the stalks of grain be short or long. The arrangement is also such that the rake can be made to engage with the grain at different points—to wit, at a point or line midway of the grain as it lies on the platform, or at any other desired point or line. The rake may be operated by hand or by power applied from the machine, as may be preferred.

The guard-fingers are made in the form shown in Fig. IV, A being a top view, and B a side view. Experience has proved that in using the common straight guard in certain conditions of the grass small particles of fine grass, gummy and fibrous matter, will work into the slit in the guard, and become deposited and packed on the surface of the cutters and in the slit, and often accumulate to such an extent as to clog and wedge the cutters tight, or so much so as to render the machine inoperative. To afford a remedy for this difficulty, the guard-finger is so constructed as to leave an opening or open spaces, *m'*, on the top thereof and on both sides of the central bar, *n*, through which the dirt, fine grass, and fibrous matter may escape before it becomes hard and packed between the cutters and guards. To accomplish this the upper part of the guard is constructed with two outer or overhanging bars, *m m*, as fully shown in Fig. IV. These bars meet and join the central bar, *n*, at one common point, *m''*. The under half of the guard is composed of one bar, *n'*, having a shank or projecting end, *n''*. The guard is cut or recessed out, as seen at 6, Fig. IV, for the purpose of forming a recess for the cutter-bar to work in.

It will be seen that the overhanging bars *m m* permit a large portion of the stalks of grain or grass being cut or severed at some distance from the center-line of the guard, and while the cutters have their greatest momentum—*i. e.*, at a distance from the limit of their throw—while all straws or stalks which escape being severed against the overhanging bars will be severed against the central bar, and thus render the cutting more easy, perfect, and and certain.

Those portions of the guards which extend in rear of the angle *d* serve the purpose of scraping up and loosening the gummy and fibrous matter which has a tendency to collect on the cutters back of the cutting-edges thereof, and as these parts extend back onto the finger-bar, as seen in Fig. II, the gummy matter which is scraped up has a free exit onto the finger-bar, on may fall out through the space between the cutters and finger-bar. This construction also enables the guards to mutually brace and support each other when in place on the finger-bar, as shown in Fig. II, and hence they are less liable to bend or break than if each guard stood alone and unsupported.

It will also be seen that provision is made for bracing the guards against the outer shoe or divider and the inner shoe or clamp, so that the guards are braced and supported laterally by the inner and outer shoe. This is accomplished by making the inner shoe wider at a point thereof, as shown at J, and the outer shoe wider at a point thereof, as shown at *m'''*, so that these widened or projecting parts will brace against the overhanging or brace part of the guard-finger, as shown in Fig. II. These projections also afford cutting-edges, against which the cutters act to cut or sever any stalks of grain or grass which come into the space between the guard and shoe, and which are not cut against the guard, and thus the cutting of all stalks of grain or grass which come into these spaces is insured, and all danger of the cutters becoming clogged either in the outer or inner shoe is obviated. These guards may be made of wrought-iron by forging or by casting, from hard iron, or from malleableized iron, or by making the upper half of steel and casting the lower part, and then brace or otherwise fasten the two parts together at the point. By the use of steel in one part of the guard a steel cutting-edge is obtained in the guard. By making guard-fingers in this skeleton form lightness and strength are combined with sufficient width to mutually brace and support each other when arranged in their proper position on the finger-bar.

In order to support and protect the outer end of the cutter-bar between the outside shoe and guard-finger, a bearing-piece, Z, is provided and arranged in front of the finger-bar, and is fastened thereto, so that the outer end of the cutter-bar will be thereby supported at the extremity of its inner throw or vibration.

In Fig. I the machine is represented as used for reaping grain. To adjust it for cutting grass or to be used as a mower, the removable platform R'', the raking apparatus, and the supporting-wheels N A and N A' are detached and removed and the finger-bar and clamp lowered so that the shoe G will rest upon the ground and the clamp made fast in the frame, which, with the driving-wheel W, will support the frame of the machine in its proper upright position, with the finger-bar resting upon the ground. All this is but the work of a few minutes, and is so simple that any laborer can make the change. In this manner the machine is made a mower.

The cutters are operated in a common manner by suitable mechanism connected with the driving-wheel.

It will be apparent that many different ways for holding and adjusting the finger-bar of a harvesting-machine may be devised, so that said machine can be used for cutting grass and grain without a change of finger-bar. The invention is not therefore limited to the particular means shown, but it is intended to include all such obvious modifications as will not depart from the principles of the said invention.

Having now fully described the said combined reaping and mowing machine in all its parts, as a whole and also in each particular improvement, and having complied with the statute authorizing the grant of a separate patent for each distinct part or branch of the original invention, what I claim in this division as the invention of the said FORBUSH, and desire to secure by these Letters Patent, is—

1. So connecting the cutting apparatus having a short and separate finger-bar to the main frame of the machine that it may be adjusted to different heights for reaping or lowered to the ground for mowing without changing the position of the main frame, substantially as described.

2. Connecting the finger-bar to the grain side of the main frame and supporting it by one end only by means of an adjustable device and the inwardly-projecting ends of the cross-pieces of the main frame, substantially as set forth.

3. The slotted frames K K and locking-bolts *i i*, applied and used for the purpose and substantially as set forth.

In testimony whereof I hereunto subscribe my name in the presence of two witnesses.

C. WHEELER, JR.

Witnesses:
W. H. MEAKER,
WM. ALLEN.